United States Patent [19]

Conley et al.

[11] 3,744,209

[45] July 10, 1973

[54] STERILIZED PACKAGING SYSTEM

[75] Inventors: Thomas F. Conley, Dixon; George A. Muck, Rockford, both of Ill.

[73] Assignee: Dean Foods Company, Rockford, Ill.

[22] Filed: Jan. 13, 1971

[21] Appl. No.: 106,112

Related U.S. Application Data

[63] Continuation-in-part of Ser. No. 21,159, March 19, 1970, abandoned.

[52] U.S. Cl. ............................ 53/22 R, 2/2, 53/37, 53/86
[51] Int. Cl. ............................................ B65b 31/02
[58] Field of Search.................... 53/22 A, 86, 90, 53/94, 112 A, 37; 312/1, 3

[56] References Cited
UNITED STATES PATENTS

| | | | |
|---|---|---|---|
| 3,035,886 | 5/1962 | Hickey | 53/22 X |
| 3,439,966 | 4/1969 | Perkins et al. | 312/1 |
| 3,501,213 | 3/1970 | Trexler | 312/1 |
| 3,245,194 | 4/1966 | Carski | 53/22 |
| 3,376,689 | 4/1968 | Simpson et al. | 53/94 X |
| 2,561,404 | 7/1951 | Nordquist | 53/112 R |

*Primary Examiner*—Travis S. McGehee
*Attorney*—McDougall, Hersh & Scott

[57] ABSTRACT

This application discloses sterile canning apparatus and method which utilizes a closed chamber in which is maintained a microorganism-killing atmosphere and in which product containers are sterilized, filled with a sterile product, and the closures for the containers are sterilized and applied in a sterile atmosphere to ensure a sterile product. In order to achieve high production rates, an operator in protective clothing may enter the chamber to maintain the equipment and thus maintain the sterile environment.

10 Claims, 4 Drawing Figures

PATENTED JUL 10 1973 3,744,209

INVENTORS
Thomas F. Conley
George A. Muck
by McDougall, Hersh & Scott Att'ys

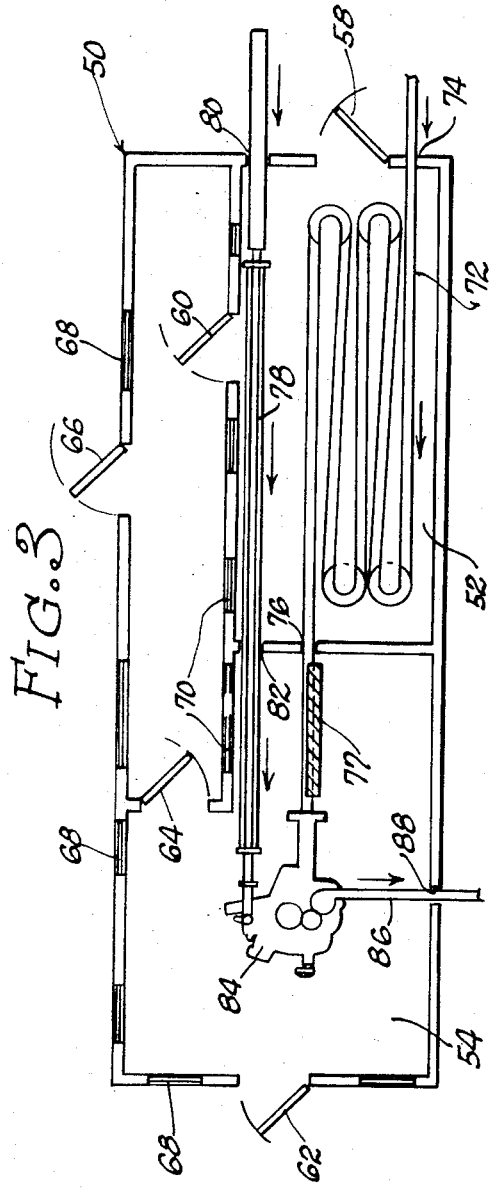
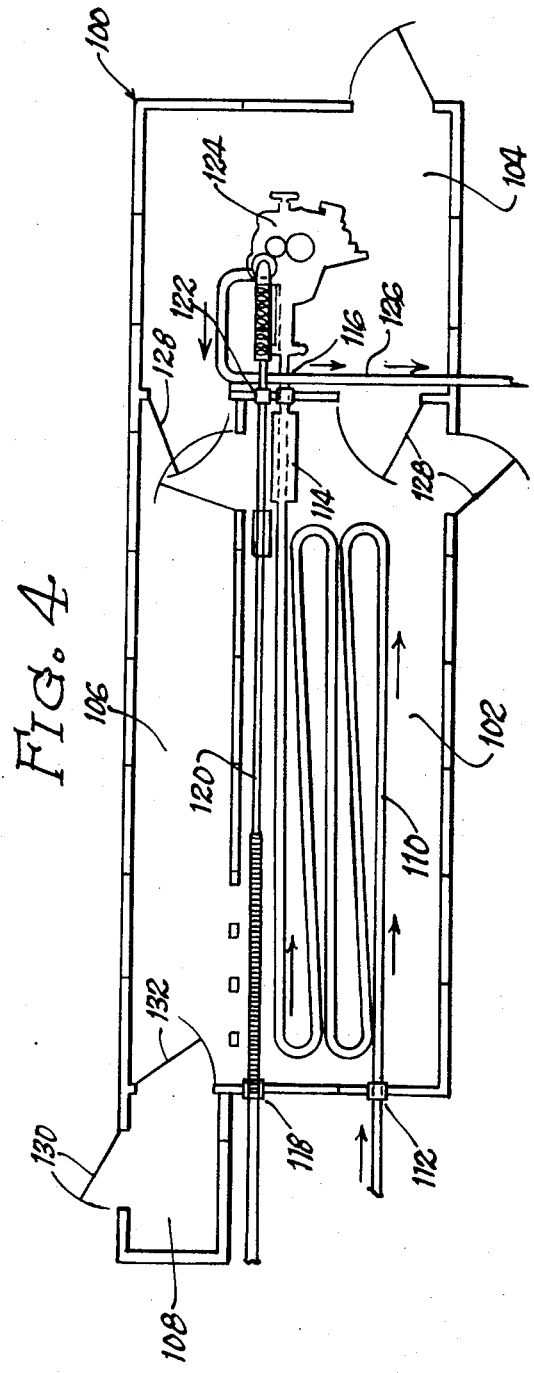

STERILIZED PACKAGING SYSTEM

BACKGROUND OF THE INVENTION

This application is a continuation-in-part of application Ser. No. 21,159, filed Mar. 19, 1970 now abandoned.

The invention relates to the sterilization and canning of foods. More specifically, it relates to a method for economically sterilizing and canning foods at high rates of production.

The canning or placing of foods in containers, sealing the containers, and subjecting containers and contents to elevated temperatures in order to preserve the food is an art which is relatively highly developed. The well-established objective of this conventional method of canning includes the need to produce a sterile food product, that is, one free from pathogenic and other spoilage organisms. In addition, there is the need to accomplish this objective as economically as possible in order to compete with other methods of food preservation and marketing. At the same time there is also the need to produce a product which will have a natural flavor, color, and consistency. In many instances, especially with heat-sensitive products, this is not possible.

An approach to the problem of heat damage to the food product has been the development of the techniques of ultra-high-temperature sterilization and aseptic canning of food products. In this method, the food product is sterilized in thin films outside the container; the sterile product is filled into sterile containers in an aseptic atmosphere and the filled container is then sealed with a sterile lid in an aseptic atmosphere.

As stated, an important ultimate objective is to provide a sterile food product in a sterile container. In order to fully appreciate the significance of the word "sterile," it is helpful to provide a definition of this word as it is used in the context of this application and with which those concerned with this technology would generally agree. Thus, if an environment is considered to be capable of being in various states ranging from one in which it has a large population of living microorganisms to one where it is free of such organisms, then the words "surgically sterile," "aseptic," and "sterile" are used in this application to define conditions going from the large population state to the free state. Therefore, a "surgically sterile" area is one which through environmental control and sanitation techniques has an extremely low level of living microorganisms. An "aseptic" area is one where precautions are taken for the exclusion of microorganisms but which might or might not be free of them. Thus, a "sterile" area is defined as an area which is free from all living microorganisms. In order to insure a completely safe product it is desirable that not only should the product be sterile but that it be filled and canned in a sterile area, so that the sterility of the product, the containers and their closures is assured. However, the systems in use are are best aseptic, so that there remains an uncertainty.

Therefore, it is an object of this invention to provide a novel sterile product canning apparatus and method which not only sterilizes the containers and closures but provides a sterile area for filling the previously sterilized product into the sterile containers and a sterile area for sealing the sterile closures to the sterilized cans.

The aseptic canning apparatus and methods frequently are designed to operate at high speeds — and by high speeds it is meant the sterilizing, filling, and closing of in excess of 300 cans per minute. However, in actual operation the desired rates or production are often not achieved. All too frequently there are equipment failures which require that the line be shut down while the problem is obviated. Though in many cases the failure may be relatively easy to correct in a short time, there are significant consequences. For instance, a not uncommon failure is a jam-up in the machinery employed for applying the sterile closures to the filled containers in the aseptic atmosphere. Such a failure may be corrected, but in order to do so it is necessary for an operator to have access to the machinery, and in the process of doing so the aseptic environment in the affected area is lost. Once lost it becomes necessary to maintain the equipment is shut-down condition, while the aseptic conditions are re-established by the application of superheated steam or other sterilizing media. During these periods much production time is lost. Also, it may become necessary to simply discard cooked sterile food product being supplied to the filling area, because the product originates from a continuous cooking process which cannot be shut down without difficulty and expense. Obviously, other elements in the system are subject to failure, and when such occur similar problems arise. The end result is that all too frequently the desired production rates are not achieved over sustained periods of time.

Therefore, it is an object of this invention to provide a novel method of operating a canning apparatus which is effective to minimize the time necessary for maintenance and repair so as to facilitate optimum production at a high rate.

In addition to the foregoing problem, there is the further situation that considerable expense is necessary for the purchase and installation of the machinery used in high-speed aseptic canning. When the elements of high initial costs and high operating costs are factored very often the economies hoped for as the result of using high-speed aseptic equipment are not achieved.

Therefore, it is another object of this invention to provide a novel method of operating a sterile system which permits the use of relatively economical apparatus.

BRIEF SUMMARY OF THE INVENTION

The above and other objects are achieved by a method of operating a sterile food or drug product packaging system which includes the steps of conveying containers and their closures into a chamber with an atmosphere which is not only sterile but is able to sterilize the containers and closures in a very short period. A sterile food or drug product is conveyed into the chamber and the containers are filled and closed. A further step in one embodiment of the method in order to optimize production is to provide that, in the event of machine or other failure, an operator normally not in the chamber enters it wearing clothing to protect him from the effects of the sterile environment and correct the difficulty, whatever it may be, and in this manner reduce the "down time" to a minimum value.

BRIEF DESCRIPTION OF THE DRAWINGS

Embodiments of the invention are described in the detailed description taken on connection with the figures of the drawings in which:

FIG. 3 is an illustration of means which may be used to practice an alternative embodiment of the invention; and FIG. 4 is an illustration of means which may be used to practice still another alternative embodiment of the invention.

DETAILED DESCRIPTION

Figure 1:
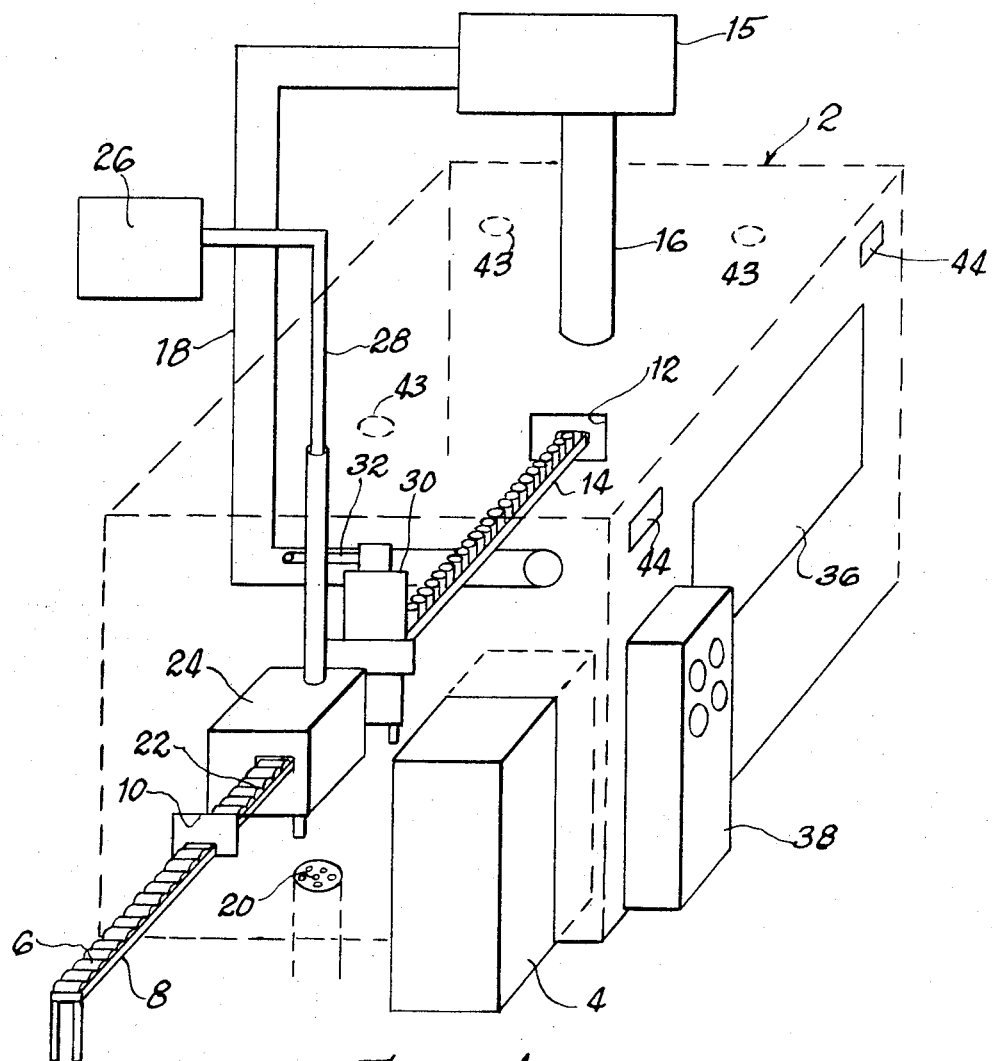
FIG. 1 is a perspective illustration in diagrammatic form of apparatus useful in carrying out the invention.

In order to effect sterilization of containers, their closures and to effect sterile filling with a food or drug product and closure of the filled container, the invention utilizes an enclosed chamber 2. The chamber is provided with a double door air lock 4 for the entry and exit of personnel into the chamber. Means for the entry of unfilled and unsterilized containers 6 on a conveyor 8 may be provided by an opening 10 provided with means to permit entry of containers while maintaining the atmosphere inside the chamber intact. Such means are well known in the art, and may take a number of forms. For instance, rotating wheels with pockets to hold each entering container partially in and partially out of the chamber, such as shown in U.S. Pat. No. 2,514,027, may be used for this purpose.

An opening 12 is provided to permit exit of filled and closed containers carried by a conveyor 14. The opening 12 is likewise provided with a means similar to that in opening 10, which permits passage of the containers while at the same time maintains the atmosphere in the chamber.

Sterilization of containers for food or drugs by the destruction of pathogenic or spoilage organisms such as bacteria may be accomplished in the chamber by the provision of any one or more of a number of atmospheres. A heated atmosphere wherein the temperature within the chamber is in the range of 250° F. to 1,000° F. will provide: first, a sterile room, i.e., one maintaining its entire contents, including equipment, in a sterile condition; and, second, one which will sterilize within a relatively short period cans, closures, and other elements such as the protective garments of operating personnel entering the chamber.

The heated sterilizing atmosphere may be constituted by dry hot air; hot air with a controlled humidity, dry or controlled humidity inert gases, superheated steam, or saturated steam. Alternatively, certain gases such as ethylene oxide, propylene oxide, or chlorine could be used. Likewise, any combination of the above is possible and the choice would depend upon the designer taking into consideration such factors as economics, ease of handling, availability, and type of container and closure to be sterilized.

In the illustrated embodiment, the sterilizing atmosphere is provided by source 15 through a suitable conduit 16 to the interior of the chamber 2 for distribution throughout the chamber. Suitable return ducts such as that shown at 18 may be provided so that atmosphere may be recirculated through the source 15. The source may include filter and/or traps as is well known in the art for the removal of impurities, together with means to add make-up atmosphere. It is preferable that the atmosphere in the chamber be maintained at a pressure very slightly higher than normal atmospheric pressure external to chamber to positively exclude contaminated air from the chamber.

To assist in maintaining the sterility of the chamber, drains such as that shown at 20 equipped with sanitary traps may be provided. Such drains may be used to dispose of excreted food product and waste created by cleaning of the chamber which may occur periodically.

The equipment in the chamber comprises a conveyor 22 which is a continuation of the conveyor 8 carrying unfilled containers to an apparatus 24 for filling the containers with a food product. The length of the conveyors 22 and the speed of travel of the containers thereon are selected to be such that the containers will be sterilized by the atmosphere in the chamber a short time after they enter. This may be accomplished in less than two minutes with temperatures in the range indicated. Such filling apparatus may be constituted by commercially available equipment and be supplied with a food product from a source 26 through a conduit 28. The length of the conduit 28 within the chamber and the filling apparatus 24 may be insulated to protect the food product from excessive, possibly deleterious, heat rise. The source 26 may be constituted by commercially available apparatus for cooking, sterilizing and cooling food. "Sterilization in Food Technology" by C. O. Ball and F. C. W. Olson, published by McGraw-Hill in 1957, describes particularly in chapter 2 thereof a number of different systems for this purpose.

The closures are conveyed and sterilized similar to the containers. Conveyor 32 is provided to convey the closures into the sterile atmosphere and to the sealing apparatus. Conveyor 32 is of sufficient length to provide enough time to sterilize the closures.

Apparatus 30 for applying the sterile closures to the container follows the filling apparatus 24. If the containers are cans such apparatus may be of the type for rolling the edge of the closure onto the top edge of an upright filled can to form a seal. This type of machine and others for applying closures of different types to other kinds of containers includes moving parts which must be driven. Driving means for such machines, as well as driving means for other machinery in the chamber, may be provided by flexible shafts 32 which extend through the opening in the wall of the chamber which openings are provided with seals around such shafts precluding the passage of the outside atmosphere into the chamber. In this manner, there is no need to provide drive motors in the chamber constructed to operate at the relatively high temperatures encountered.

The apparatus in the chamber may be completed by the provision of the conveyor 14 carrying filled and closed containers out of the chamber through the opening 12. Once outside of the chamber, the filled containers may be handled in a conventional manner — washing, cooling, labeling, and storage.

In further accordance with the invention, the apparatus for its practice in the embodiment described includes an observation window 36 dimensioned to give an operator a view of the entire operation in the chamber so that he may visually ascertain the operations within. Alternatively, or additionally, audible or visible alarms may be provided to provide an indication of a malfunction. Instrumentation may be provided in a panel 38 to permit the recording of data with respect to temperature, flow rates, and other parameters of the system. In addition, the panel 38 may be provided with controls in order to control the condition of the atmosphere by regulating the source 14 and flow through the conduits 16 and 18. The operator's viewing area, the air lock 4, and the location of the panel 38 may itself be located within a surgical sterile room (not shown). The room can be maintained surgically sterile by circulating its air through bactericidal filters and the use of ultraviolet light.

In order to achieve the objects of the invention one or more of the operators in the surgical sterile room are provided with clothing capable of covering their entire bodies. This clothing is thermally insulated to the extent that one wearing it can survive and function for sustained periods of time in the atmosphere of the sterile chamber 2, without incurring physical harm. It would have associated with it life-support equipment 42 permitting the wearer to breathe and be reasonably comfortable while working in the sterile chamber. Clothing suitable for this purpose may be modeled on or copied from space suits worn by persons engaged in space trips, such as have occurred in orbits around the earth and to the moon.

The clothing used for this purpose is designed to protect the wearer from his environment with adequate insulation and internal cooling. Yet, it is light-weight and flexible enough, especially in the hand area, to allow the wearer to accomplish mechanical tasks. Life-support capabilities of such clothing includes a supply of oxygen to the face mask at the proper temperature and concentration and also a means for removing or neutralizing the carbon dioxide expelled during breathing. Such clothing may also include sensors to detect any adverse conditions developing in the suit and to immediately warn the wearer. Communications equipment could be provided so that constant voice communication could be maintained with the wearer while he is in the chamber and another operator in the surgical sterile room.

When it becomes necessary during operation of the system to enter the sterile chamber 2 because of a malfunction, such as a jam-up in the closing machine 30, an operator wearing the protective clothing described may enter the chamber through the air lock 4 from the surgical sterile room and effect the necessary maintenance and/or repairs to eliminate the source of difficulty. In this manner, the sterility of the chamber is maintained at all times so that the only time lost is the time necessary to effect whatever maintenance and/or repairs are called for and no time is lost from production either to permit cooling of the machine so that it can be handled or to permit resterilization of the chamber and the equipment therein.

The sterile room is further provided with a series of ceiling water sprinklers 43 which would be remotely controlled electronically by the operator from the control pack on his person while he is in the sterile room or by the operator located in the surgically sterile room. The purpose of the sprinkler system would be to:
1. Douse the operator in the sterile room with cooling water in the event of an emergency.
2. Quickly reduce the temperature of the sterile room when it is necessary to enter the room without protective clothing.
3. Aid in washing and rinsing the room following production runs.

At the same time the sprinkler system was actuated, vents 44 would open and fans would expel from the room any steam that would have formed in the room.

While the system has been described in connection with the chamber where the temperature of the atmosphere is in the range of 250° to 1,000° F., it is also possible to use this method with a lower environmental temperature, that is, on the order of 190° to 250° F. for packing ultrahigh pasteurized products such as milk or milk products. It can also be used with such lower temperatures to package acid-type products such as fruit juices. The containers used may be metallic cans, but it is also possible to utilize containers of other materials such as plastics or paper which can withstand the conditions encountered in the chamber. Glass containers may be used at the higher (250° to 1,000° F.) environmental temperatures or at the lower (190° to 250° F.) temperatures if methods for cooling the glass containers such as sterile cooling sprays are provided immediately before filling in order to temper the glass.

In another embodiment of the invention rather than maintaining an environment in the chamber which would limit the time that an operator could spend in the chamber even though he were wearing protective clothing including a life support system the chamber could first be sterilized completely using for example, unsaturated steam for that purpose. Once sterilized the chamber could be provided with an atmosphere which itself is sterile so as to maintain the sterility of the chamber. Such an atmosphere could be sterile cool air. The temperature of the chamber could then be reduced so that an operator wearing protective clothing including a self-contained life support system and thereby not constitute a continuing source of contamination could enter the chamber and remain there for relatively long periods of time up to a complete work shift. The operator's protective clothing could be rendered sterile prior to his entry into the chamber by any suitable means.

This embodiment would have the advantage of permitting the use of less expensive operator's protective clothing and life support systems and would provide for continuous operator's presence in the chamber.

FIG. 3 illustrates alternative apparatus for the practice of the invention. In this embodiment, a chamber 50 is constructed to have three main sections 52, 54, and 56. The section 52 may be entered by means of an air-tight door 58 from the outside of the chamber or by a similar door 60 from the section 56. An air-tight door 62 permits entry into the section 54 from the outside of the chamber while a similar door 64 permits entry from the section 56. Entry to the section 56 from outside of the chamber is provided by an air-tight door 66. It is contemplated that doors 58 and 62 would be used for emergency purposes only.

Observation windows 68 may be provided in the locations illustrated in the outer wall of the chamber or elsewhere as desired. Similar windows 70 are provided in the inner walls of the section 56 so that the operations in sections 52 and 54 may be observed.

Installed in the section 52 is container conveyor 72 which as may be seen can include several reversing turns so as to provide a total path of travel for entering containers sufficient to permit their sterilization by the environment of the chamber and yet not require an excessively long chamber. As with the chamber entry 10 in the embodiment of FIG. 1, means may be provided at the entry 74 and exit 76 to maintain the desired atmospheric environment within the section 52. Located within the section 54 so as to be supplied by sterilized containers from the conveyor 72 is an apparatus 77 for filling the empty containers with a sterilized food product supplied from a source external to the chamber.

Installed partially within the section 52 and partially within the section 54 is a closure conveyor 78. The conveyor 78 enters the section 52 through an opening 80 and exits through an opening 82. As the closures travel through that section they are exposed to the sterilizing environment a sufficient length of time to sterilize them. Both of these openings may be provided with means to maintain the desired atmospheric environment within the section 52.

A machine 84 for applying sterile closures from the conveyor 78 to the filled containers from the conveyor 72 is installed within the section 54. Such a machine may be of the same type as that described in connection with the embodiment of FIG. 1. A conveyor 86 carries the filled enclosed containers out of the section 54 through an opening 88 where they may then be handled in a conventional manner. Means are provided at the opening 88 to maintain the atmosphere within the section 54 while permitting passage of the filled containers.

In order to monitor and control the process, suitable instrumentation such as gauges, recorders, control buttons, and the like may be provided on the interior wall of the section 56.

Figure 2:
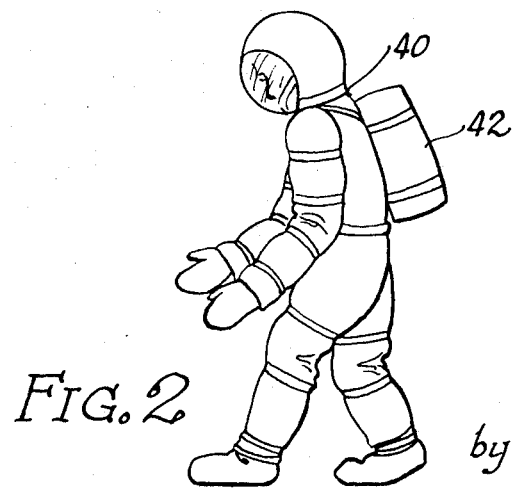
FIG. 2 is an illustration of protective clothing which may be used by an operator in carrying out the invention.

In the utilization of the apparatus of FIG. 3 in this embodiment of the invention, an operator protected by clothing of the type illustrated in FIG. 2 and described above observes and controls the operation of the process from the section 56. As indicated previously, life-support equipment may be self-contained and carried by the operator or may be provided by means of hoses carrying fresh air from a source external to the chamber and returning stale air to the outside of the chamber. The section 56 may be maintained in a surgically sterile condition by the use of bactericidal filters and ultraviolet light.

Experience has shown that interruptions to the sterilizing and can-filling-and-closure processes more often than not occur because of stoppages of the closure machine 84. It is contemplated that the operator will have more occasion to enter the section 54 rather than the section 52. Consequently, this section may be maintained at different temperatures, both of which are effective to maintain sterile conditions. However, it has been found that the section 54 can be maintained at a lower temperature than the section 52, and because of this the protective clothing for the operator may be designed to withstand the less harsh environment of section 54. As an example, it is possible to maintain the temperature in the section 54 in the range of 250° to 300° F. while the temperature in the section 52 is maintained at a temperature of 400° to 600° F. Consequently, an operator wearing protective clothing which is more readily available and economical may enter the section 54 more frequently and remain there for long periods or be stationed there for an entire work shift. At the same time, if a jam-up or some other cause of stoppage should occur in the section 52, he may enter that section for brief periods of time to correct the difficulty so that production can resume.

FIG. 4 illustrates still another embodiment of apparatus that may be used in the practice of the invention. In this embodiment a chamber 100 includes sections 102, 104, 106, and 108. A looped container conveyor 110 enters the section 102 through an opening 112 and supplies containers which have been sterilized by virtue of their passage through the sterile environment maintained in section 102 to a filling apparatus 114. The filling apparatus in the sterile room is supplied with a sterile food product from a source external to the chamber 100. The filled sterile containers leave the section 102 through an opening 116 in its wall. At the same time container closures enter the section 102 through an opening 118 in its wall and are carried and sterilized by a container conveyor 120 through an opening 122 to the section 104.

Installed within the section 104 is a closure machine 124 which applies and seals the closures to the containers and has associated therewith a conveyor 126 which carries the now-filled-and-closed containers to the exterior of the chamber 100.

The section 106 functions as an operator's control and observation section and is maintained in a surgically sterile condition. Air-tight doors 128 contact the various sections to each other while maintaining the desired atmosphere in each section.

In this embodiment of the invention the section 108 is provided as an operator's dressing room and air lock connected by a door 130 to the exterior of the chamber and by a door 132 to the section 106.

As explained in connection with the embodiment of FIG. 3, the sections 102 and 104 may be maintained at different sterilizing temperatures with the temperature of the section 102 being higher than the temperature of the section 104. Thus, in this embodiment as well the operator may wear protective clothing suitable to permit more frequent entry and longer stays in section 104 as contrasted to section 102. With suitable clothing the operator may remain in section 104 for an entire work shift.

The invention has been described in connection with particular embodiments thereof. However, it is intended to cover by the claims appended hereto all embodiments and modifications which come within the scope of those claims and the disclosure.

What is claimed as new and desired to be secured by Letters Patent of the United States is:

1. A method of providing for the operation of a sterile product packaging system wherein containers are filled with a sterile product and closed comprising the steps of:

continuously maintaining a sterilizing environment in a chamber to keep it free of all living microorganisms;

conveying non-sterile containers to be filled into the chamber while maintaining the sterilizing environment thereof and sterilizing the containers;

supplying a sterile product and filling the containers therewith in the chamber while maintaining the sterilizing environment thereof;

supplying closures, sterilizing them and applying them to the filled containers in the chamber while maintaining the sterilizing environment thereof; and correcting malfunctions of the equipment in the chamber by personnel in the chamber while at the same time maintaining the sterilizing environment in the chamber so as to prevent contamination of the chamber so that substantially continuous operation may be maintained.

2. The method of claim 1 wherein the step of conveying and sterilizing the containers is carried out in one section of the chamber maintained at a first and higher temperature and wherein the step of applying closures to filled containers is carried out in another section of the chamber maintained at a second and lower temperature.

3. The method of claim 1 wherein the sterilizing environment of the chamber is provided by the presence of a heated atmosphere constituted by dry hot air, hot air with a controlled humidity, dry or controlled humidity, hot inert gases, superheated steam, saturated steam, or any combination of these atmospheres.

4. The method of claim 3 wherein said heated atmosphere has a temperature in the range of 250° to 1,000° F.

5. The method of claim 3 wherein said heated atmosphere has a temperature in the range of 190° to 250° F.

6. The method of claim 3 wherein personnel entering the chamber to correct malfunctions are provided with clothing and equipment to protect them from harmful effects of the sterilizing environment while permitting them to perform corrective functions.

7. The method of claim 1 wherein the sterilizing atmosphere is constituted by a sterilizing gas.

8. The method of claim 1 wherein the sterilizing atmosphere is provided by the presence of sterilizing gases such as ethylene oxide, propylene oxide, or chlorine, or any combination of these atmospheres.

9. The method of claim 1 including the step of monitoring the functioning of the equipment from a location external to the chamber.

10. The method of claim 9 wherein upon the detection of a malfunction of the equipment in the chamber from the location external to the chamber, personnel wearing clothing and equipment to protect them from the harmful effects of the sterilizing environment enter the chamber to correct it.

* * * * *